US006225541B1

(12) United States Patent
Kodera et al.

(10) Patent No.: US 6,225,541 B1

(45) Date of Patent: May 1, 2001

(54) KEY LEVER FOR A MUSICAL INSTRUMENT

(76) Inventors: Wolf Kodera, Schutzenstrasse 22, Witten (DE), D-58452; Arnfred Rudolf Strathmann, Schlichtingstrasse 10, Melsdorf (DE), D-24109

(*) Notice: Subject to any disclaimer, the term of this patent is extended or adjusted under 35 U.S.C. 154(b) by 0 days.

(21) Appl. No.: 09/380,135

(22) PCT Filed: Feb. 26, 1998

(86) PCT No.: PCT/DE98/00567

§ 371 Date: Apr. 17, 2000

§ 102(e) Date: Apr. 17, 2000

(87) PCT Pub. No.: WO98/38627

PCT Pub. Date: Sep. 3, 1998

(30) Foreign Application Priority Data

Feb. 26, 1997 (DE) .......................................... 297 03 411 U

(51) Int. Cl.[7] ....................................................... G01D 7/08

(52) U.S. Cl. ................... 84/385 P; 84/380 R; 84/385 R; 84/385 A

(58) Field of Search .............................. 84/385 P, 380 R, 84/385 R, 385 A

(56) References Cited

U.S. PATENT DOCUMENTS

| | | | | |
|---|---|---|---|---|
| 1,702,962 | | 2/1929 | Buescher | 84/380 R |
| 1,727,868 | * | 9/1929 | Dreves | 84/385 P |
| 3,688,633 | | 9/1972 | Nagao | 84/380 R |
| 4,704,939 | | 11/1987 | Staubinger | 84/385 P |
| 4,967,632 | | 11/1990 | Etheredge et al. | 84/385 P |
| 5,417,135 | | 5/1995 | Staubinger | 84/385 P |

FOREIGN PATENT DOCUMENTS

| | | |
|---|---|---|
| 1 903 244 | 1/1969 | (DE) . |
| 93 17 477 | 3/1994 | (DE) . |
| 197 01 972 | 7/1998 | (DE) . |
| 1034063 | 7/1953 | (FR) . |
| 2 615 646 | 5/1987 | (FR) . |
| 499979 | 2/1939 | (GB) . |
| 717902 | 11/1954 | (GB) . |
| WO 96/21923 | 7/1996 | (WO) . |
| WO 98/32119 | 7/1998 | (WO) . |

* cited by examiner

*Primary Examiner*—Shih-Yung Hsieh

(74) *Attorney, Agent, or Firm*—Merchant & Gould P.C.

(57) ABSTRACT

The invention relates to a key lever for musical instruments, including a swivelling support (1) and a key (3) which closes a finger hole of the musical instrument. The key (3) is provided with a seal (7) for sealing the finger hole and is fixed to the support (1) in such a way that it can be adjusted. A screw (5) extends through a drill hole (4) in the support (1), the drill hole (4) being in alignment with the center of the key (3). The screw (5) is connected effectively to the key (3) and in different positions produces different positions of the key (3) in relation to the support (1). The operating end of the screw (5) is accessible from the side of the support (1) opposite the key (3). According to the invention, a vibration-reducing transition piece (6*a*) is positioned between the screw (5) and the key (3) and the support (1) has a spherical segment shaped, curved section. The center of the imaginary sphere lies in the plane of the seal area and the drill hole (4) has a larger diameter than the part of the screw (5) extending through the drill hole (4). The screw (5) has a base plate adjacent to the support (1), the diameter of the base plate being larger than that of said the drill hole (4). The surface of the base plate adjacent to the support (1) is curved in a spherical segment shape to correspond to the support (1).

11 Claims, 1 Drawing Sheet

KEY LEVER FOR A MUSICAL INSTRUMENT

BACKGROUND OF THE INVENTION

The invention concerns a key suspension (lever) based on the precharacterizing clause of claim 1.

These types of key suspensions are known from the published German Patent Application 19 03 244 or from Great Britain Patent 717 902. There, an adjustment of the screw enables setting the distance between the key and the support, with the support being regularly fashioned somewhat cup-like with a U-shaped cross section. Mounting the key on the support fashioned in pendulum-movement or swivel-movement fashion is said to compensate inaccuracies, and also to enable a reliable sealing of the rim of the finger (tone, sound, note) hole, even when the support lies diagonally to the finger hole.

In practice, however, there are always difficulties in achieving an optimal fit of the key to the finger hole and/or to the rim of the finger hole. Seals not placed over the entire finger hole rim at the same time lead, for one thing, to obtaining the desired sealing of the finger hole only after a delay. Depending upon the stiffness of the pendulum mounting of the key, additional comparatively high key-actuating forces are required to close the latter with a reliable sealing. This can cause stress.

Additionally, the delayed closure of the finger hole causes the musician to automatically work with a higher finger pressure, in order to achieve an as rapid as possible complete closure of the finger hole. Also the possibility of undesired stress appears here.

SUMMARY OF THE INVENTION

The object of the invention is to improve a key suspension in accordance with the genre, such that there will be enabled as precise an alignment as possible of the key to the finger hole with the simplest means possible, and that extraneous noises will be avoided as much as possible when closing the key.

The task underlying the invention is resolved by a key suspension having the features of claim 1.

In other words, the invention proposes two measures, namely first a simplified key adjustment beneficail to its optimal placement on the finger hole rim, and second an acoustical decoupling of the key from the support and other components.

For setting the key, adjustment is usually done by skilled workers. Bending the support and/or bending a support arm on which the support is located accomplishes this. Because of corrections and counter-corrections, this procedure requires a considerable expenditure of time. Compared to this, setting the key is simplified innovatively in that the key is not attached to the support in vertically moving fashion but rather in a pendulum- or swiveling movement, and is capable of being fixed in any position.

Movement in pendulum fashion is made possible by the fact that the screw that fixes the key to the support can be moved over the spherical-segment-shaped surface of the support, whereby the key can be titled about its center in all arbitrary directions. Since in manufacturing musical instruments, the length of the support, hence its distance to the hinge point and the distance of the hinge point from the finger hole, is determined in a simple way, and in practice always reliably, and is converted into the attachment of the key suspension, as a rule to guarantee a reliable and all around simultaneous sealing of the finger hole rim there is needed merely a tilting movement accommodation of the key.

An acoustical decoupling of the key from the support and other components is accomplished by a vibration-damping suspension of the key on the support by means of a vibration-damping transition piece.

The transition piece can be advantageously provided between the key and the screw. Key resonances and key noises appearing when striking against the finger hole rim can, in this manner, be effectively avoided, since only the comparatively low key weight needs to be attenuated.

Arrangement of the sphere center point in the plane in which the key seal lies against the finger hole rim guarantees an all around, simultaneous close fit of the seal against the finger hole rim.

The spherical-segment-shaped area of the supporting plate that lies against the outside of the support guarantees that the key will always be tilted about the center of its seal.

It is also advantageous to provide on the underside of the support aligned toward the key a plate in the form of a counter plate that is adapted to the spherical segment pattern of the support, so that a large area emplacement and a positive guidance of the key about the imagined center point of the sphere is always guaranteed.

For reducing the number of required components, said counter plate can be simply formed by the surface of the nut cooperating with the screw that is pointing toward the support.

However, with free motility of the key, in order to enable a reliable localization and a firm tightening of the screw, the surface of the counter plate and the underside of the support can advantageously be produced in friction-prone fashion, e.g. by suitable mating of materials, surface roughness or by a friction-prone coating of one or both surfaces.

The base plate adjacent to the outer side of the support can be fashioned in particularly simple fashion by the screw head itself, so that a very small number of components are possible and, in this manner, development of noises or adjustment for inaccuracies are avoided.

The use of a separate disc as a base plate, on the other hand, advantageously avoids costly machining of the underside of the screw head for obtaining a spherical-segment-shaped contour. Additionally, with the final tightening of the screw, it prevents an undesired shifting of the key. It has been shown that the friction between a disc of this type and the support can be greater than between the disc and the screw head, so that the screw can be tightened and, hereby, retains its angular position on the support.

An especially greater adjustment range for the key is enabled if the hole displays at least twice the diameter of the screw, or that part of the screw in the support extending through this hole.

Advantageously, other components, as for example the key surfaces, usually inlaid with mother-of-pearl, used for actuating the key, are not mounted directly on the key but rather on the support or other components from which the key is separated by the vibration-damping transition piece. Avoided hereby are canted positions, bends and similar effects that can cause erroneous positioning of the key on the finger hole rim. The same as for the key surfaces applies for stops that serve either for height limitation of the support and/or the key arm on which they are fixed, or that can be produced like a “follower” for coupling and common actuation of two keys. In the case of these stops a direct contact with a key is also avoided as much as possible.

A space- and weight-saving arrangement of the button surface or of the stop is possible directly on the screw head, whereby for its actuation the screw displays an appropriate, circumferential surface, e.g. knurled for screwing in or out without tools, or with a hexagonal contour or similar tool surface.

If the key surfaces or the stop are to be arranged eccentrically near the screw head, they can advantageously be mounted on the separate disc forming the base plate. In this way, the screw can be loosened or tightened without changing the position of the key surface or the stop.

Beyond the pure function of key support, the support can be lengthened to accommodate a key surface. Furthermore a support lengthened in this way can form stops known in practice, which can strike against pads made of felt or other damping materials, e.g. foam materials that are provided either for height limitation of the opening movement of the key, or as followers when several keys are to be actuated simultaneously by a single key and are connected with one another with an appropriate connecting rod.

BRIEF DESCRIPTION OF THE DRAWINGS

Examples of embodiment of the invention will be explained in more detail in the following with reference to the drawings. Shown are.

DETAILED DESCRIPTION

Figure 1:
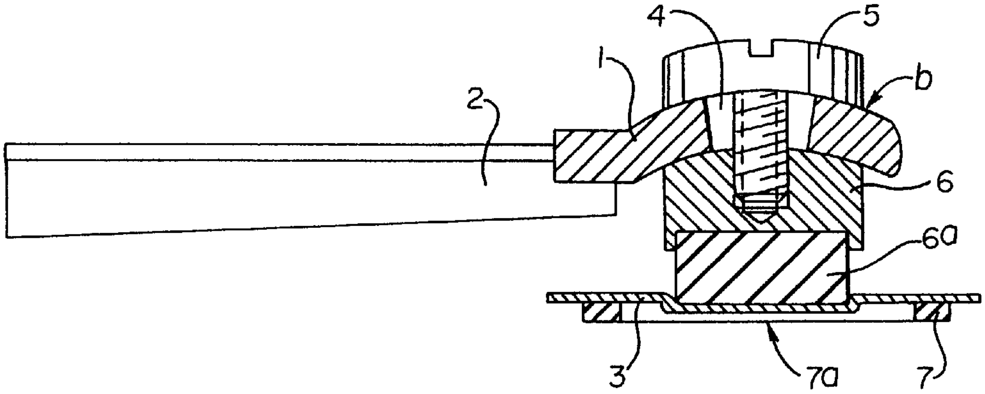
FIG. 1 a cross section through a support with a key suspension.

Designated with 1 in FIG. 1 is a support that is curved in the shape of a sphere segment and is disposed at the outermost end of the key arm 2. The support 1 and key arm 2 serve for actuation of a key 3, with which a finger hole (not shown) of a wind instrument can be closed or opened.

The support 1 displays a drilled hole 4 through which extends a screw 5, there being provided on the side of support 1 lying opposite to the screw head a nut 6 against which there closes a noise-isolating, vibration-damping transition piece 6*a* made of an elastomer, a sponge material or the like, and to which, in turn, the key is fixed, e.g. by gluing. The key 3 displays a ring-shaped, circumferential seal 7 whose center is characterized with 7*a*.

A simple accommodation of the key 3 to the associated finger hole of the wind instrument can be accomplished by loosening the screw 5, closing the key 3 whereby said key automatically correctly aligns itself. Next, the screw 5 can be drawn up tight so that the key 3 is now aligned optimally to the finger hole, and with the closure procedure a simultaneous emplacement all around the seal 7 on the finger hole rim is guaranteed. Laymen can perform the adjustment of the key 3 in this manner, without problem, and should undesired off-tune sounds occur when playing the wind instrument, adjustment can be undertaken in the shortest of time with minimum expense.

Figure 2:
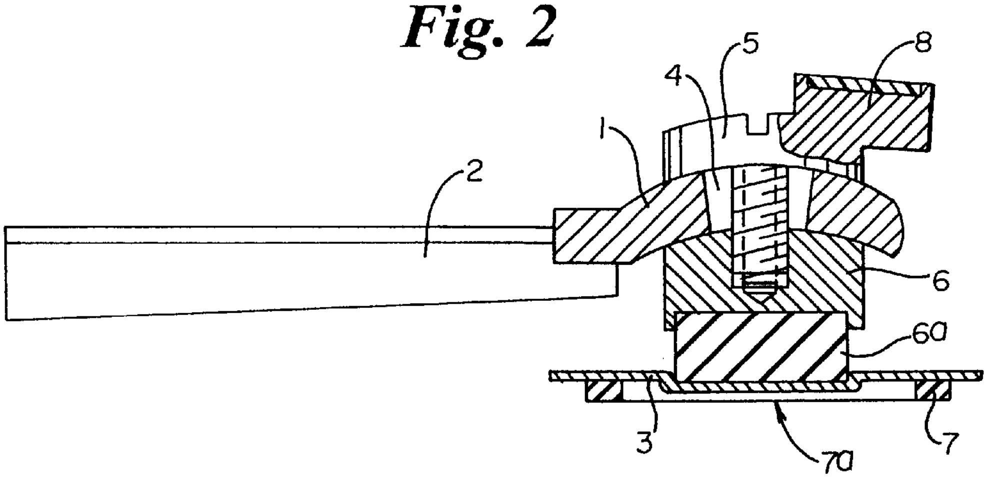
FIG. 2 an example of embodiment of a key suspension with a key surface.

FIG. 2 shows a second example of embodiment, where the head of the screw 5 carries a key surface 8. In the example of embodiment illustrated, this key surface is mounted eccentrically to the screw head, whereby one assumes that, with the position of the key surface once optimally adjusted, the screw head, with loosening and later tightening of the screw 5, always remains in the original starting position.

Alternatively to the example of embodiment of FIG. 2, provision can be made to enable mounting the key surface 8 centrally in the screw head, e.g. through a fine-thread drilled hole into which the key surface having an appropriately formed screw can be screwed. Alternatively to this, it is possible to mount the key surface with the aid of spring-loaded clamping or the like on the screw, so that the key 8 can be removed in order to actuate the screw 5, and then can be re-installed. Furthermore, alternatively provision can be made for the screw to be operated from the outside on its circumferential contour, e.g., through tool surfaces provided there, whereby it can be planned that the key surface be fixed on the surface of the screw head.

Figure 3:
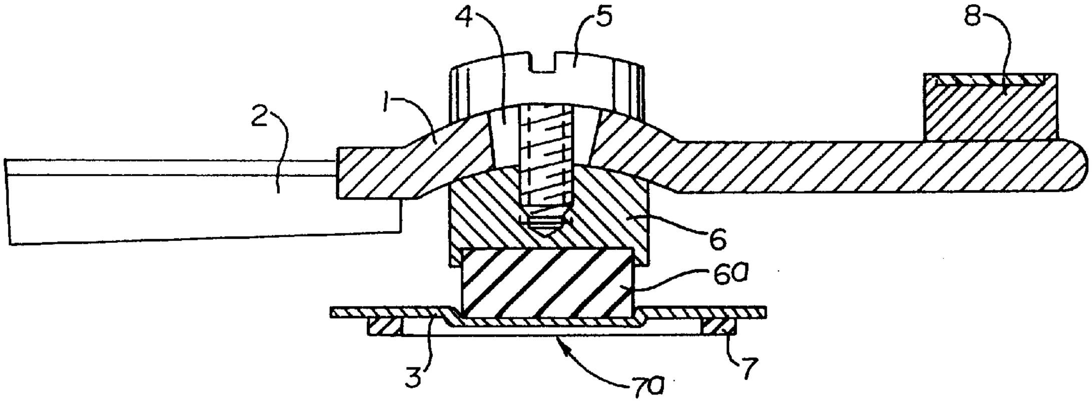
FIG. 3 another example of embodiment of a key suspension with a key surface.

FIG. 3 shows another example of embodiment, where the support 1 is lengthened on its side turned away from the key arm 2 in order to enable mounting either a key surface 8 or a stop that limits the movement of a key or of a key arm. If the key, deviating from the example of the embodiment illustrated, displays a recess in its center, then the support 1 can be curved in spherical-segment fashion oppositely to the example of the embodiment illustrated, therefore convexly toward the key, and the support can be disposed in the recess of the key where the sphere center point can again lie in the plane of the key seal.

What is claimed is:

1. Key suspension for musical instruments comprising: a swiveling support (1); a key (3) closing a finger hole of the musical instrument, the key (3) being provided with a seal (7) sealing the finger hole and the key being adjustably fixed to the support (1); a screw (5) extending through a drilled hole (4) in the support (1) that is in alignment with the center of the key (3), the screw (5) being effectively connected with the key (3) with different positions producing different positions of the key (3) relative to the support (1), and the actuating end of the screw (5) being accessible from the side of the support opposite the key; wherein a vibration-damping transition piece (6*a*) is disposed between the screw (5) and the key (3); the support (1) displays a spherical-segment shaped curved section, with the center point of the imaginary sphere lying in the plane of the seal area; the drilled hole (4) displaying a larger diameter than the part of the screw (5) extending through the drilled hole (4); the screw (5) displaying a base plate adjacent to the support (1), the diameter of the base plate being larger than the diameter of the drilled hole (4); the surface of the base plate adjacent to the support (1) being curved in a spherical segment shape corresponding to the support (1).

2. The key suspension according to claim 1 comprising a counter plate associated to the screw (5), on the side of the support (1) facing the key (3), said counter plate curved in spherical segment fashion on its surface adjacent to the support (1), to correspond with the support (1).

3. Key suspension according to claim 2, wherein the surface pointing toward the support (1) of the nut (6) associated with the screw (5) forms the counter plate.

4. Key suspension according to claim 2, wherein the cooperating surfaces of the support (1) and of the counter plate are fashioned in friction-prone fashion.

5. Key suspension according to claim 1, wherein the screw head forms the base plate adjacent to the outside of the support (1).

6. Key suspension according to claim 5, wherein the key surface (8) and/or the stop is provided on a separate disc.

7. Key suspension according to claim 1, wherein a separate disc forms the base plate adjacent to the outside of the support (1).

8. Key suspension according to claim 1, wherein the diameter of the drilled hole (4) is at least twice as great as the diameter of that part of the screw (5) extending through the drilled hole (4).

9. Key suspension according to claim 1, wherein a key surface and/or a stop is provided, separated from the key (3) by the transition piece **(6*a*)**.

10. Key suspension according to claim 9, wherein the key surface (8) and/or the stop is provided on the head of the screw, with the screw (5) displaying a circumferential actuation surface.

11. Key suspension according to claim 8, wherein the support (1), as seen from its swivel axis, is lengthened out over the area of screw (5), and displays there the key surface (8) and/or the stop.

* * * * *